Jan. 22, 1963 W. R. BERTELSEN 3,074,499
SELF PROPELLED VEHICLE TRACK
Filed Dec. 3, 1959
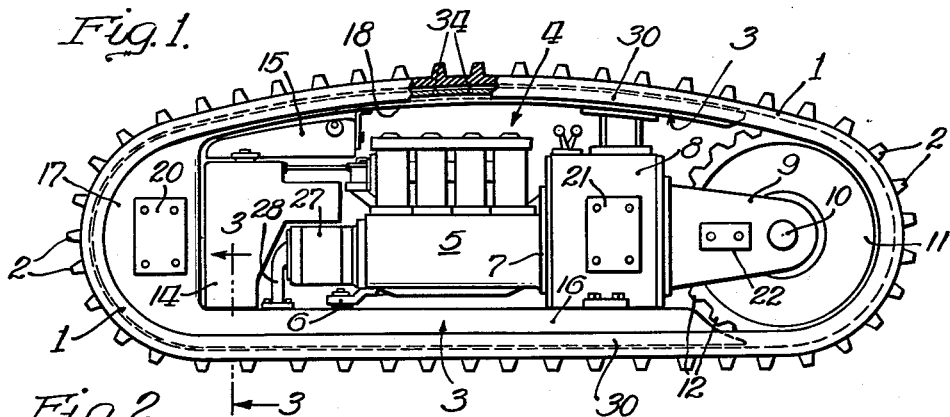
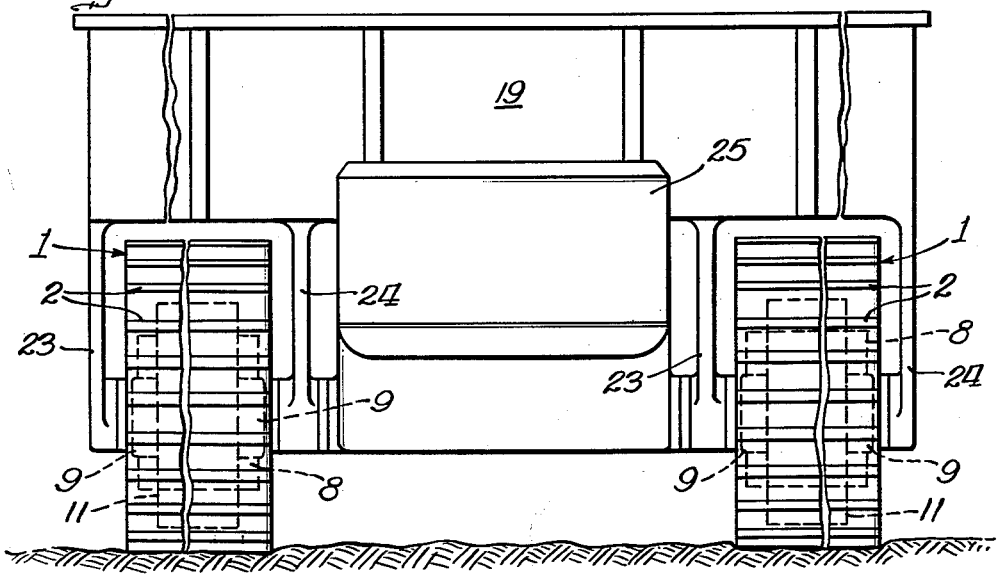
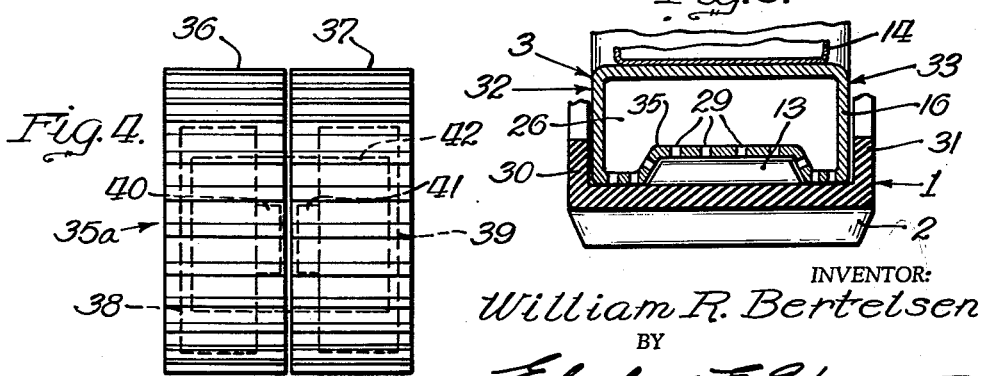
INVENTOR:
William R. Bertelsen
BY
Eberhard E. Wolley
Atty.

United States Patent Office 3,074,499
Patented Jan. 22, 1963

3,074,499
SELF PROPELLED VEHICLE TRACK
William R. Bertelsen, Neponset, Ill., assignor, by direct and mesne assignments, of twenty-five percent to William E. Martin, Kewanee, Ill., and of twenty-five percent to Martin Engineering Company, Neponset, Ill., a corporation of Illinois
Filed Dec. 3, 1959, Ser. No. 857,214
5 Claims. (Cl. 180—9.62)

This invention relates to a power driven traction device feasibly adaptable as a totally independent unitary towing vehicle, or as an attachable unit for propelling any other form of vehicle as a combination thereof.

More specifically, the invention is directed to a self propelled unitary traction assembly in the form of a vehicle moving track and one that is bodily interchangeable side to side on a vehicle or from vehicle to vehicle.

One of the objects of the present invention relates to the combination and use of a power operated track that embodies track mounted power means, transmission means, track guide means and drive means to operate the track, all of which are confined and supported within the confines of the track structure and within the track loop per se. The various means also include other accessories that are required to complete and to contribute to the power operation of the unitary track assembly.

Another object of the invention relates to the incorporation of an air pressure system that supplies air under pressure to the track to establish an air cushion between the track and the track guide for urging the load of the power mechanisms out of physical contact with the ground engaging portion of the track. This feature contributes to the successful use of the power means within the track.

A still further object is to provide a wide faced track having adequate stability to progress over various kinds of terrain and to remain upright when used as a towing instrumentality, with the power mechanisms furnishing the load forces and weight to aid in enhancing the tractive efforts of this power track.

Another object relates to the provision of a self powered and propelled track that includes dual track members of equal contour which are adjacently disposed, but capable of independent operation through suitable operative means incorporated in the transmission unit. With this addition, a track of this nature can readily be made to turn in either direction by relative track speeds of the dual unit while towing some load or object.

Other objects and advantages of this invention will hereinafter appear in or become evident from the following detailed description relating to the accompanying drawings forming a part of this specification.

In the drawings:
FIG. 1 is a side elevational view of an exemplary power track arrangement depicting one adaptation of the inventive concept herein disclosed;
FIG. 2 is an end view of a vehicle employing two power tracks of the present invention to permit full pay load transportation by the vehicle body due to the tracks housing the power units;
FIG. 3 is a fragmentary vertical cross sectional view of one portion of the track structure as it appears along the plane of the line 3—3 in FIG. 1; and
FIG. 4 is a diagrammatic end view of a modified arrangement of self-propelled track incorporating dual track means for turning purposes.

The self propelled vehicle track is best shown more or less diagrammatically in FIG. 1 and comprises a flexible track 1 providing a ground engaging unit having cleats 2 on its exterior periphery, the track being entrained about a track guide 3 that provides a carrier for the power means 4 confined within the internal loop of the track 1. The power means 4 comprises an engine 5 mounted at 6 on the carrier or track guide 3 with another portion of the engine being suitably mounted at 7 upon the transmission 8.

Transmission 8 carries hollow laterally spaced brackets 9 containing suitable drive means connected with shaft 10 of the track drive wheel 11, the shaft 10 being journalled on the brackets 9. Wheel 11 has peripheral teeth or cogs 12 to engage peripherally internally arranged teeth 13 provided on the flexible track 1 for track propulsion by the wheel 11.

The track assembly also carries a fuel tank 14 and oil tank 15 which are suitably mounted upon the track carrier 3. In the construction shown in FIG. 1, the track guide structure or carrier 3 comprises a base 16 forming a shoe to slidably rest upon the ground engaging section of track 1, a half moon shaped contiguous upright track end 17 and an overhead track support 18, with the base 16 and support 18 terminating adjacent wheel 11.

While a number of means may be employed to support and carry a vehicle body such as 19, the track assembly is here provided with attachment pads 20, 21 and 22 arranged in pairs on the opposite sides of the track to receive corresponding mounting members of a vehicle body 19 or from any other kind of unit to be connected with and transported or towed by one or more of the track assemblies shown in FIG. 1. For example, an operator's seat may be mounted on one or more sets of corresponding pads located on each side of the track with suitable controls for operating the track disposed within easy reach from such a seat.

As shown in FIG. 2, the vehicle body 19 has several sets of brackets such as 23 and 24 on each side to straddle each track and to accommodate suitable fastening means to attach the brackets to the above described pads that are preferably arranged in aligned pairs on each side of the track assemblies used in FIG. 2. The vehicle body 19 can also include an operator's compartment or cab 25 equipped with controls for manipulating the tracks.

One of the objectionable problems of the past relates to the excessive friction produced by the assembled track elements. Breakdowns and replacements were expensive and time consuming, while the presence of excessive friction also limited speeds and maximum loads as well as the efficiency of normal track operation.

The self propelled power track of this invention is devised for more efficient operation and to provide a track propulsion means of fewer moving and assembled parts in the track operation per se and a track that can be operated under light frictional factors and yet carry its own power means.

To reduce the overall frictional condition, the carrier 3 is constructed as a plenum having a hollow interior chamber 26 as shown in FIG. 3. An air pump or blower 27 is connected for operation by the engine 5 and an air discharge duct 28 delivers air from the pump 27 into the carrier-plenum chamber 26 to create an air pressure reservoir as defined by the hollow carrier walls.

As illustrated in FIG. 3 the carrier is provided, at least along its lower track engaging face, with exhaust ports 29 to deliver and discharge compressed air into the area lying between the top of the earth or ground engaging track and the track supported carrier. The track 1 is additionally provided with side flanges 30 and 31 to slidably contact opposite exterior faces 32 and 33 of the carrier 3 for guidance purposes and to also create a limited air seal along the coacting track and carrier surfaces to aid in retaining compressed air between the track and carrier. With this arrangement a cushion of sustaining air is established to urge the carrier out of physical contact with the track to create a minimum frictional resistance relationship in the operation of the self powered track.

Small vents 34 may be provided in the upper wall of the overhead support 18 of the carrier 3 to cause air under pressure to float the track over the top of the carrier to minimize the frictional contact at this area.

It should be observed that the outer peripheral contour of the track includes a longitudinally arranged and inwardly offset or recessed wall 35 to establish clearance for the accommodation of the track teeth 13. This recessed wall 35 and the teeth 13 aid to further guide the track along the upright median plane of the carrier, while the offset and teeth form pockets or small reservoirs for compressed air accumulation of the air supplied through ports 29.

The described self powered track may have a wide tread width sufficient in extent to stabilize the track for normal upright use, particularly when such track is employed as a single unit. In FIG. 4, the track 35a employs dual track assemblies 36 and 37 that are alternately powered by suitable drive wheels 38 and 39 driven through suitable bracket confined drive means 40 and 41 receiving controlled drive from a suitable transmission 42.

Actually, the modified arrangement is substantially similar to the first described form except that it is made with a split track per se which incorporates a selective dual drive to either actuate both tracks together and in fore or aft direction or to provide opposite actuation to the tracks and in varying amounts for turning such a track assembly under operation.

The foregoing description has been directed to a preferred construction of the self powered and self contained vehicle track of this invention of the character disclosed in the drawings. It is contemplated, however, that certain changes may be made in the individual elements or in their combinations without departing from the fundamental concept of the invention. The extent of such modifications shall, however, be governed by the breadth and scope of the language expressed in the following claimed subject matter directed to and defining the present self powered vehicle track of this invention.

What I claim is:

1. A power traction unit comprising a rigid track guide providing a given track carrying marginal contour for the unit, a continuous flexible track entrained about said track guide forming a ground engaging instrumentality to move said unit, power mechanism connected to operate said track, a compressed air source for said unit, said track guide presenting an outer facial contour extending from one vertical side thereof about the outward external periphery to the other vertical side thereof establishing a transverse sectional contour which is maintained over the length of the track guide, said track having a matching transverse cross sectional contour to substantially coincide with the track guide facial contour creating a devious parting area between said guide and track, and air conducting means connected with said compressed air source and having communication with the devious parting area to introduce air under pressure between said guide and track forming air floating guidance means to stabilize said track and guide both vertically and laterally, said devious parting area between said track and guide acting to retard the escape of said pressurized air from between said coacting track and track guide, said track and guide including coacting means disposed along the median plane of the power traction unit providing segregated pocket areas along the length of the track to act as reservoirs for compressed air supplied thereto by said air conducting means.

2. A power traction unit comprising a rigid track guide defining the working contour of the unit, a continuous flexible track encircling said track guide, power mechanism carried by said track guide including a compressed air source and drive means connected to propel said track along said guide, said track guide exterior being constructed with longitudinally extending angularly related and continuous peripheral and contiguous lateral walls for the reception of said track thereover, said track having an internal contour providing matching angularly arranged wall surfaces to substantially coincide with the aforesaid track guide walls, and air conducting means having connection with said compressed air source and with portions of the spaces lying between the angularly related coacting walls of the rigid track guide and the track to create an air pressure belt therebetween, said angularly positioned walls providing a tortuous path to restrain free air discharge from between said guide and track to float one of the latter upon the other developing both vertical and lateral air glideways, said track and said track guide having coacting recessed means together with spaced projections riding therein inwardly of the lateral confines of the power traction unit whereby to retard longitudinal displacement of said entrapped pressurized air along the length of said guide and track.

3. A power traction unit comprising an internal structure including a rigid guideway providing a lower rigid supporting base, an overhead carrier and at least one curved terminal end joining the base and carrier, said guideway base and carrier having circumferential lateral surface face portions therealong and opposite outward vertical face portions thereon which extend about the curved terminal end of the guideway, a track of continuous flexible material being channel shaped in transverse cross section providing a lateral face portion and opposite outward vertical face portions to seat over and upon said guideway and against either side of said guideway, and compressed air supply means with air duct connection with said guideway and track to introduce air under pressure therebetween for retarded entrapment within the track channel area and along the adjacent rigid guideway areas to create an air cushion separation between such guideway and the entrained track, said air discharge from out of the coacting vertical face portions of the guideway and track being slowly directed in vertical planes inwardly of the location of the unit from the track to minimize ground or surface dust upheaval, said base and carrier of said guideway terminating short of the full length of the continuous track, and power means mounted upon the supporting base of said guideway including a drive means extending beyond the terminal end portions of the guideway and connected to drive said track, said drive means having solid surface areas thereon constructed and arranged to operate closely adjacent the terminal ends of the guideway to coact therewith to further retard the free escape of compressed air out of the guideway along the direction of the track channel.

4. A power traction unit comprising a rigid guideway providing a base, an overhead carrier and at least one curved terminal end joining the base and carrier, said guideway base and carrier having lateral surface face portions and opposite outward vertical face portions all following about the curved terminal end of the guideway, a track of continuous flexible material having an inwardly directed channel shape in transverse section providing a lateral face portion and opposite outward vertical face portions to seat upon said guideway and thereabout at either side thereof, and compressed air supply means with air duct connection with said guideway and track to introduce air under pressure therebetween for retarded entrapment within the track channel area and the adjacent guideway to create an air cushion separation between such guideway and track, said air discharge being slowly directed in vertical planes and inwardly of the unit from the track to minimize ground or surface dust upheaval, said base and carrier of said guideway terminating short of the full length of the continuous track, and power mechanism mounted upon said guideway including a sprocket wheel disposed beyond the terminal end portions of the guideway to drive the track, said track including spaced teeth to mesh with said sprocket wheel, said teeth being operatively confined between said guideway and track forming individual pockets providing air reservoirs for segregated amounts of said compressed air between said guideway and said track.

5. In the combination of claim 4, wherein said guideway has a longitudinally formed recess extending thereabout, and said track teeth move through said recess, said recess and teeth having similar contours whereby longitudinal escape of compressed air is retarded by said teeth in the longitudinal direction of the track and out of the terminal ends of said guideway.

References Cited in the file of this patent

UNITED STATES PATENTS

| | | |
|---|---|---|
| 756,600 | Dodge | Apr. 5, 1904 |
| 809,048 | Furchtbar | Jan. 2, 1906 |
| 849,882 | Bartley | Apr. 9, 1907 |
| 1,317,103 | Rimailho | Sept. 23, 1919 |
| 1,400,218 | Howe | Dec. 13, 1921 |
| 1,404,882 | Moore | Jan. 31, 1922 |
| 1,987,265 | Miller | Jan. 8, 1935 |
| 2,220,890 | Cock | Nov. 12, 1940 |
| 2,383,754 | Watt | Aug. 28, 1945 |
| 2,484,754 | Silva | Oct. 11, 1949 |
| 2,592,023 | Gleason | Apr. 8, 1952 |
| 2,652,289 | Bekker | Sept. 15, 1953 |
| 2,652,290 | Bekker | Sept. 15, 1953 |
| 2,756,830 | Hurthig | July 31, 1956 |